(12) United States Patent
Zhao et al.

(10) Patent No.: US 10,313,657 B2
(45) Date of Patent: Jun. 4, 2019

(54) DEPTH MAP GENERATION APPARATUS, METHOD AND NON-TRANSITORY COMPUTER-READABLE MEDIUM THEREFOR

(71) Applicant: BOE TECHNOLOGY GROUP CO., LTD, Beijing (CN)

(72) Inventors: Jibo Zhao, Beijing (CN); Jing Yu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 276 days.

(21) Appl. No.: 15/324,814

(22) PCT Filed: Dec. 25, 2015

(86) PCT No.: PCT/CN2015/098938
§ 371 (c)(1),
(2) Date: Jan. 9, 2017

(87) PCT Pub. No.: WO2017/107192
PCT Pub. Date: Jun. 29, 2017

(65) Prior Publication Data
US 2018/0204340 A1    Jul. 19, 2018

(51) Int. Cl.
*H04N 13/00* (2018.01)
*H04N 13/204* (2018.01)
(Continued)

(52) U.S. Cl.
CPC ............. *H04N 13/204* (2018.05); *G06T 7/40* (2013.01); *G06T 7/596* (2017.01); *H04N 13/10* (2018.05);
(Continued)

(58) Field of Classification Search
USPC ............................................... 348/48, 42–43
See application file for complete search history.

(56) References Cited

U.S. PATENT DOCUMENTS 5,063,441 A    11/1991   Lipton et al.
6,055,330 A *   4/2000   Eleftheriadis ........... G06T 9/007
                                                         382/154
(Continued)

FOREIGN PATENT DOCUMENTS

CN    101498889 A    8/2009
CN    101854559 A    10/2010
(Continued)

OTHER PUBLICATIONS

State Intellectual Property Office of the P.R.C (SIPO) Office Action 1 for 201580002629.2 dated Jun. 8, 2017 18 Pages (including translation).
(Continued)

*Primary Examiner* — Nigar Chowdhury
(74) *Attorney, Agent, or Firm* — Anova Law Group, PLLC

(57) ABSTRACT

The present disclosure provides a depth map generation apparatus, including a camera assembly with at least three cameras, an operation mode determination module and a depth map generation module. The camera assembly with at least three cameras may a first camera, a second camera and a third camera that are sequentially aligned on a same axis. The operation mode determination module may be configured to determine an operation mode of the camera assembly. The operation mode includes at least: a first mode using images of non-adjacent cameras, and a second mode using images of adjacent cameras. Further, the depth map generation module may be configured to generate depth maps according to the determined operation mode.

17 Claims, 7 Drawing Sheets

(51) Int. Cl.
*H04N 13/10* (2018.01)
*G06T 7/593* (2017.01)
*G06T 7/40* (2017.01)
*H04N 13/243* (2018.01)
*H04N 13/20* (2018.01)
*H04N 13/128* (2018.01)

(52) U.S. Cl.
CPC ........... *H04N 13/128* (2018.05); *H04N 13/20* (2018.05); *H04N 13/243* (2018.05); *G06T 2207/10028* (2013.01); *H04N 2013/0081* (2013.01)

(56) References Cited

U.S. PATENT DOCUMENTS

| | | | | |
|---|---|---|---|---|
| 7,558,432 | B2* | 7/2009 | Zaharia | G06T 9/007 382/251 |
| 7,996,793 | B2* | 8/2011 | Latta | G06F 3/017 345/157 |
| 2002/0139920 | A1* | 10/2002 | Seibel | A61B 1/0008 250/208.1 |
| 2010/0295783 | A1* | 11/2010 | El Dokor | G06F 3/017 345/158 |
| 2012/0162200 | A1* | 6/2012 | Mishima | H04N 13/128 345/419 |
| 2014/0029789 | A1* | 1/2014 | DeLean | G06K 9/20 382/103 |
| 2014/0139429 | A1* | 5/2014 | Menadeva | G06F 3/017 345/156 |
| 2014/0157210 | A1* | 6/2014 | Katz | G06F 3/017 715/863 |
| 2015/0009149 | A1* | 1/2015 | Gharib | G06F 3/005 345/168 |
| 2015/0248167 | A1* | 9/2015 | Turbell | G06F 3/017 715/754 |
| 2015/0312445 | A1* | 10/2015 | Cha | H04N 5/2226 348/48 |
| 2016/0198144 | A1 | 7/2016 | Yu et al. | |
| 2017/0038852 | A1* | 2/2017 | Hildreth | G06F 3/017 |

FOREIGN PATENT DOCUMENTS

| | | |
|---|---|---|
| CN | 102572491 A | 7/2012 |
| CN | 102722080 A | 10/2012 |
| CN | 104539934 A | 4/2015 |
| WO | 2014081115 A1 | 5/2014 |

OTHER PUBLICATIONS

The World Intellectual Property Organization (WIPO) International Search Report for PCT/CN2015/098938 dated Sep. 27, 2016 p. 1-12.

* cited by examiner

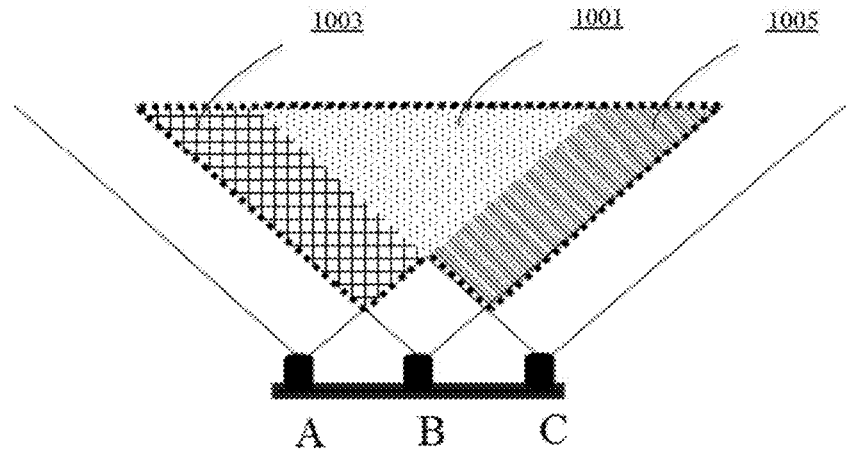

Providing a camera assembly with at least three cameras including a first camera, a second camera and a third camera, where the first camera, the second camera and the third camera are sequentially aligned on a same axis — S1102

Capturing a first image pair using the first camera and the third camera, and capturing a second image pair using the first camera and the second camera — S1104

Generating a first depth map from the first image pair, and generating a second depth map from the second image pair — S1106

Extracting histogram information from the first depth map and the second depth map, where the histogram information represents distributions of pixel numbers at different depths — S1108

Identifying a valid object appearing at a depth range based on the histogram information; and selecting one of the first mode and the second mode based on the depth range corresponding to the valid object — S1110

FIG. 11

DEPTH MAP GENERATION APPARATUS, METHOD AND NON-TRANSITORY COMPUTER-READABLE MEDIUM THEREFOR

This PCT patent application is a national phase entry under 35 U.S.C. § 371 of International Application No, PCT/CN2015/098938, filed on Dec. 25,2015, the entire content of which is incorporated by reference herein.

FIELD OF THE DISCLOSURE

The present disclosure relates to the field of 3D imaging technologies and, more particularly, relates to a depth map generation apparatus, method and non-transitory computer-readable medium therefor.

BACKGROUND

A dual-camera image recognition system uses two cameras to capture the images of objects at the same time. The dual-camera image recognition system calculates the three-dimensional coordinates of an object based on relationship between the positions of the object in the images captured by the left camera and the right camera and the distance between the two cameras.

Some dual-camera image recognition systems designed for body movement recognition may use two cameras that are 12 cm or 6 cm apart. Some dual-camera image recognition systems specifically designed for hand gesture recognition may use two cameras that are 3 cm apart. However, existing dual-camera image recognition systems may only function in a single mode.

The disclosed method and system are directed to at least partially solve one or more problems set forth above and other problems.

BRIEF SUMMARY OF THE DISCLOSURE

One aspect of the present disclosure provides a depth map generation apparatus, including a camera assembly with at least three cameras, an operation mode determination module and a depth map generation module. The camera assembly with at least three cameras may a first camera, a second camera and a third camera that are sequentially aligned on a same axis. The operation mode determination module may be configured to determine an operation mode of the camera assembly. The operation mode includes at least: a first mode using images of non-adjacent cameras, and a second mode using images of adjacent cameras. Further, the depth map generation module may be configured to generate depth maps according to the determined operation mode.

The operation mode determination module may include a sensor for detecting a current orientation of the camera assembly. The sensor may be a motion sensor, an accelerometer, an orientation sensor, or a gyroscope.

Further, the operation mode determination module may include a pre-depth map generation unit for generating a first depth map in the first mode and a second depth map in the second mode; and a recognition unit configured to extract histogram information from the first depth map and the second depth map, to identify a valid object appearing at a depth range based on the histogram information, and to select one of the first mode and the second mode based on the depth range corresponding to the valid object.

The histogram information may present distributions of number of pixels for each depth in the first depth map and in the second depth map.

In one embodiment, the recognition unit may be further configured to convert intensity levels of the first depth map and intensity levels of the second depth map to depth values; obtain number of pixels corresponding to the converted depth values of the first depth map and the second depth map; and combine number of pixels corresponding to the converted depth values of first depth map and the second depth map to obtain the histogram which covers depth ranges of both the first depth map and the second depth map. An x-axis of the histogram represents depth values.

In another embodiment, the recognition unit may be further configured to convert intensity levels of the second depth map to a set of depth values; obtain intensity levels of the first depth map corresponding to the set of depth values; calculate a mapping relationship between the intensity levels of the second depth map and the intensity levels of the first depth map that correspond to the set of the depth values; and combine number of pixels in the second depth map corresponding to the intensity levels of the first depth map based on the mapping relationship to obtain the histogram covering depth ranges of both the first depth map and the second depth map. An x-axis of the histogram represents the intensity levels corresponding to the first depth map.

Further, the recognition unit may be configured to: when an area percentage of a bump in the first depth range in the histogram is greater than a first threshold, identify that the valid object appears in the first depth range; and when an area percentage of a bump in the second depth range in the histogram is greater than a second threshold, identify that the valid object appears in the second depth range.

Another aspect of the present disclosure provides a depth map generation method, including providing a camera assembly with at least three cameras including a first camera, a second camera and a third camera. The first camera, the second camera and the third camera are sequentially aligned on a same axis. An operation mode of the camera assembly may be determined. The operation mode includes at least: a first mode using images of non-adjacent cameras, and a second mode using images of adjacent cameras. The method further includes generating a depth map based on the images obtained from the camera assembly according to the determined operation mode.

In some embodiments, determining the operation mode may include providing a sensor to detect a current orientation of the camera assembly. When the sensor detects the current orientation of the camera assembly is substantially vertical, determining that the camera assembly operates in the first mode. When the sensor detects the current orientation of the camera assembly is substantially horizontal, determining that the camera assembly operates in the second mode.

Further, the sensor may be a motion sensor, an accelerometer, an orientation sensor, or a gyroscope.

In some embodiments, determining an operation mode of the camera assembly may include generating a first depth map in the first mode, and generating a second depth map in the second mode; extracting histogram information from the first depth map and the second depth map; identifying a valid object appearing at a depth range based on the histogram information; and selecting one of the first mode and the second mode based on the depth range corresponding to the valid object.

The histogram information may present distributions of number of pixels for each depth in the first depth map and in the second depth map.

In one embodiment, extracting histogram information from the first depth map and the second depth map further include converting intensity levels of the first depth map and intensity levels of the second depth map to depth values; obtaining number of pixels corresponding to the converted depth values of the first depth map and the second depth map; and combining number of pixels corresponding to the converted depth values of first depth map and the second depth map to obtain the histogram which covers depth ranges of both the first depth map and the second depth map. An x-axis of the histogram represents depth values.

In another embodiment, extracting histogram information from the first depth map and the second depth map further includes: converting intensity levels of the second depth map to a set of depth values; obtaining intensity levels of the first depth map corresponding to the set of depth values; calculating a mapping relationship between the intensity levels of the second depth map and the intensity levels of the first depth map that correspond to the set of the depth values; and combining number of pixels in the second depth map corresponding to the intensity levels of the first depth map based on the mapping relationship to obtain the histogram covering depth ranges of both the first depth map and the second depth map. An x-axis of the histogram represents the intensity levels corresponding to the first depth map.

Further, determining an operation mode of the camera assembly may include: when an area percentage of a bump in the first depth range in the histogram is greater than a first threshold, identifying that the valid object appears in the first depth range; and when an area percentage of a bump in the second depth range in the histogram is greater than a second threshold, identifying that the valid object appears in the second depth.

The method for depth map generation may further include: in the first mode, recognizing body movements based on the generated depth map; and in the second mode, recognizing hand gestures and finger gestures based on the generated depth map.

Another aspect of the present disclosure provides a non-transitory computer-readable medium having computer programs for, when being executed by a processor, performing a depth map generation method, the method including: providing a camera assembly with at least three cameras including a first camera, a second camera and a third camera. The first camera, the second camera and the third camera are sequentially aligned on a same axis. An operation mode of the camera assembly may be determined. The operation mode includes at least: a first mode using images of non-adjacent cameras, and a second mode using images of adjacent cameras. The method further includes generating a depth map based on the images obtained from the camera assembly according to the determined operation mode.

Further, determining an operation mode of the camera assembly may include: generating a first depth map in the first mode, and generating a second depth map in the second mode; extracting histogram information from the first depth map and the second depth map; identifying a valid object appearing at a depth range based on the histogram information; and selecting one of the first mode and the second mode based on the depth range corresponding to the valid object.

BRIEF DESCRIPTION OF THE DRAWINGS

The following drawings are merely examples for illustrative purposes according to various disclosed embodiments and are not intended to limit the scope of the present disclosure.

FIG. 10 illustrates another FOV of an exemplary depth map generation apparatus according to various embodiments of the present disclosure;

FIG. 11 illustrates a flow chart of an exemplary depth map generation process according to various embodiments of the present disclosure;

DETAILED DESCRIPTION

Reference will now be made in detail to exemplary embodiments of the invention, which are illustrated in the accompanying drawings. Hereinafter, embodiments according to the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments according to the present disclosure, all of which are within the scope of the present invention.

Figure 1:
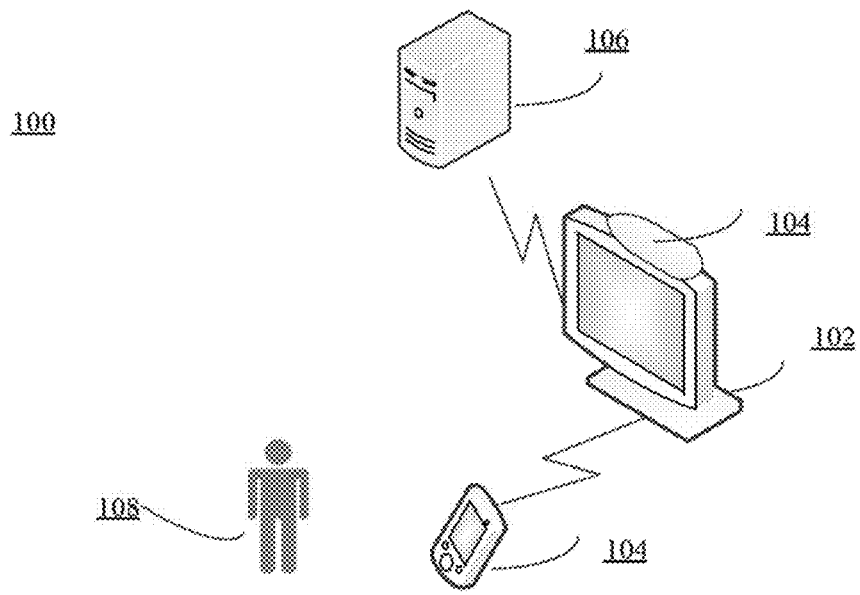
FIG. 1 illustrates an exemplary environment incorporating various embodiments of the present disclosure.

FIG. 1 illustrates an exemplary environment 100 incorporating various embodiments of the present disclosure. As shown in FIG. 1, environment 100 may include a television set (TV) 102, a remote control 104, a server 106, a user 108, and a network 110. Certain devices may be omitted and other devices may be included to better describe the relevant embodiments.

TV 102 may include any appropriate type of display device, such as a plasma TV, a liquid crystal display (LCD) TV, a touch screen TV, a projection TV, a smart TV, etc. TV 102 may also include other computing systems, such as a personal computer (PC), a tablet or mobile computer, or a smart phone, etc. Further, TV 102 may be capable of implementing 3D displays. TV 102 may incorporate any appropriate type of display modalities to create stereoscopic display effect, such as shutter glasses, polarization glasses, anaglyphic glasses, etc. In certain embodiments, TV 102 may implement naked-eye 3D display technologies.

The remote control 104 may include any appropriate type of remote control that communicates with and controls the TV 102, such as a customized TV remote control, a universal remote control, a tablet computer, a smart phone, or any other computing device capable of performing remote control functions. The remote control 104 may also include other types of devices, such as a motion-sensor based remote control, or a depth-camera enhanced remote control, as well as simple input/output devices such as a keyboard, a mouse, and a voice-activated input device, etc.

The remote control 104 may include any appropriate type of sensors that detects input from user 108 and communicates with TV 102, such as a temperature sensor, a motion sensor, a microphone, a camera, etc. Remote control 104 may be imbedded in TV 102 or separated from TV 102. In an exemplary embodiment, the remote control 104 may include one or more stereoscopic cameras that capture 3D images with depth information and detects hand gestures and body movements of user 108. The remote control 104 may also include one or more control modules that perform various functions such as switching between different operation modes based on the depth information of the captured 3D images.

User 108 may interact with TV 102 using remote control 104 to watch various programs and perform other activities of interest. The user may simply use hand gestures or body movements to control and interact with TV 102. The user 108 may be a single user or a plurality of users, such as family members watching TV programs together.

Further, the server 106 may include any appropriate type of server computer or a plurality of server computers for providing contents to user 108. The server 106 may also facilitate communication, data storage, and data processing between the remote control 104 and TV 102. TV 102, remote control 104, and server 106 may communicate with each other through one or more communication networks, such as a cable network, a phone network, a wireless network, and/or a satellite network, etc.

Figure 2:
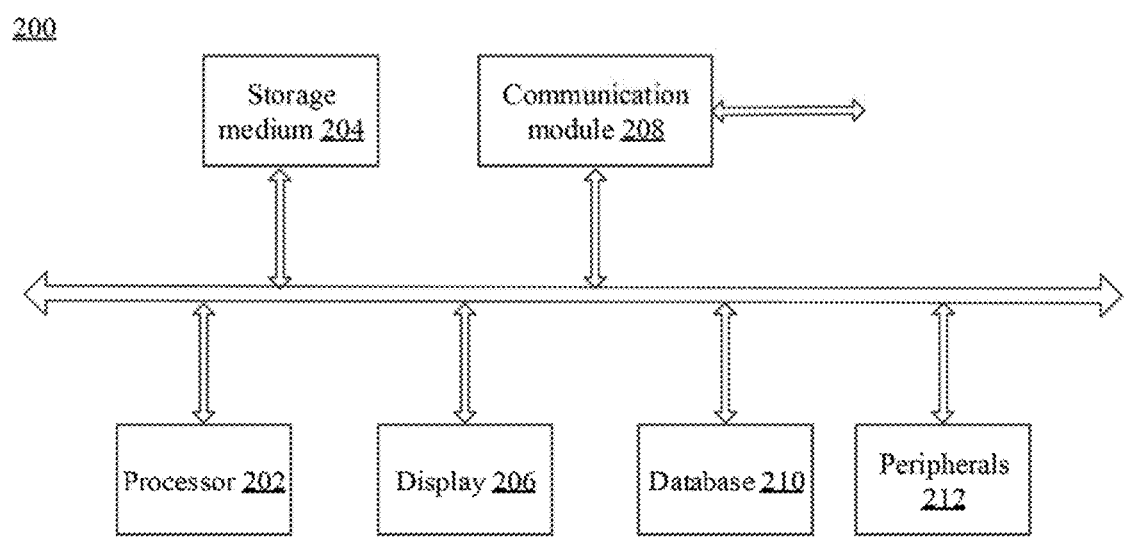
FIG. 2 illustrates an exemplary computing system according to various embodiments of the present disclosure.

TV 102, remote control 104 and/or server 106 may be implemented on any appropriate computing circuitry platform. In operation, the computing circuitry platform may obtain stereoscopic images and generate a depth map based on the stereoscopic images. The generated depth map may be utilized in various applications, such as applications for detecting body movements and hand gestures. FIG. 2 shows a block diagram of an exemplary computing system 200 that can be used to implement TV 102, remote control 104 and/or server 106.

As shown in FIG. 2, computing system 200 may include a processor 202, a storage medium 204, a display 206, a communication module 208, a database 210 and peripherals 212. Certain devices may be omitted and other devices may be included.

Processor 202 may include any appropriate processor or processors. Further, processor 202 can include multiple cores for multi-thread or parallel processing. Processor 202 may execute sequences of computer program instructions to perform various processes. Storage medium 204 may include memory modules, such as ROM, RAM, flash memory modules, and mass storages, such as CD-ROM and hard disk, etc.

Storage medium 204 may store computer programs for implementing various processes when the computer programs are executed by processor 202, such as computer programs for rendering graphics for a user interface, implementing a face recognition or gesture recognition process, etc. Storage medium 204 may store computer instructions that, when executed by the processor 202, cause the processor to generate a depth map from stereoscopic images. The computer instructions can be organized into modules to implement various calculations and functions as described in the present disclosure.

Further, communication module 208 may include certain network interface devices for establishing connections through communication networks. Database 210 may include one or more databases for storing certain data and for performing certain operations on the stored data, such as database searching. Further, the database 210 may store images, videos, personalized information about user 108, such as preference settings, favorite programs, user profile, etc., and other appropriate contents.

Display 206 may provide information to a user or users of TV 102. Display 206 may include any appropriate type of computer display device or electronic device display such as CRT or LCD based devices. Peripherals 212 may include various sensors and other I/O devices, such as body sensors, microphones, camera assembly, RGB camera, infrared camera, motion sensors (e.g., accelerometer, gyroscope, gravity sensor), environmental sensors (e.g., ambient light sensor, temperature and humidity sensor) and position sensors (e.g., proximity sensor, orientation sensor, and magnetometer), etc.

The present disclosure provides a depth map generation apparatus and method. Stereo images, as used herein, may refer to images taken by a camera assembly. The camera assembly may have a plurality of cameras for capturing stereoscopic images. Among the plurality of cameras, one or more pairs of cameras may be employed to capture various images. For example, a camera assembly may have three cameras, which means the camera assembly has three camera pair combinations. When a camera assembly takes one shot of a current scene, a pair of images corresponding to one pair of cameras may be obtained. The pair of images may include a left image and a right image. In another example, a pair of stereoscopic images may be taken by two individual cameras.

In the present disclosure, a pair of stereoscopic images taken by a pair of cameras, i.e., a left camera and a right camera, may be referred to as a stereo image pair or a pair of stereo images. A stereo image pair consists of two images of the same scene, usually taken from slightly horizontally separated points, e.g., from the left camera and the right camera.

For exemplary purposes, the camera assembly described in embodiments of the present disclosure may refer to a camera assembly with three cameras. It should be noted that similar method and/or apparatus embodiments may also apply to camera assemblies with more than three cameras and/or three or more individual cameras.

It should be noted that the camera assembly may also collect three-dimensional videos. The 3D videos collected by one pair of cameras may be divided into a plurality of frames, and each frame may correspond to a pair of stereoscopic images.

Figure 3:
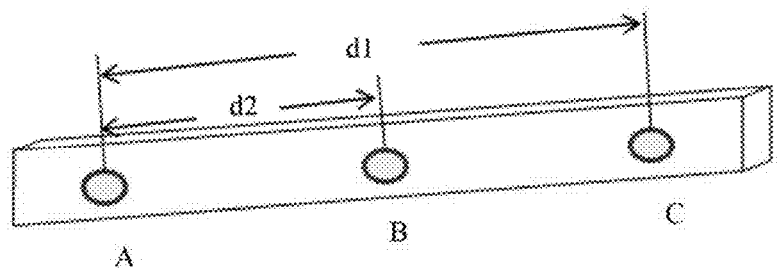
FIG. 3 illustrates a front view of an exemplary depth map generation apparatus according to various embodiments of the present disclosure.

FIG. 3 illustrates a front view of an exemplary depth map generation apparatus according to various embodiments of the present disclosure. As illustrated in FIG. 3, the exemplary depth map generation apparatus may include a camera assembly having three cameras. The three cameras may include a first camera denoted as A, a second camera denoted as B and a third camera denoted as C. In an exemplary embodiment, the three cameras A, B and C may be sequentially aligned on a same axis.

Further, the distance between the first camera A and the third camera C is denoted as d1. The distance between the first camera A and the second camera B is denoted as d2. The second camera B may be placed at a predetermined position between camera A and C (i.e., d2<d1). In one embodiment, camera B may be placed in the center between the first camera A and the third camera C (i.e., d1=2×d2).

With such settings, a stereo image pair taken by non-adjacent cameras (e.g., camera A and camera C) may include more data related to a longer distance from the depth map generation apparatus and may be used for body gesture recognition. A stereo image pair taken by adjacent cameras (e.g., camera A and camera B, or camera B and camera C) may include more data related to a shorter distance from the depth map generation apparatus and may be used for hand gesture recognition.

For example, the distance between camera A and camera C may be 6 cm, and the distance between camera A and camera B may be 3 cm. A stereo image pair taken by camera A and camera B may include more data in the range of 0.16 m-0.75 m from the depth map generation apparatus. A stereo image pair taken by camera A and camera C may include more data in the range of 0.5 m-2 m from the depth map generation apparatus.

Figure 4:
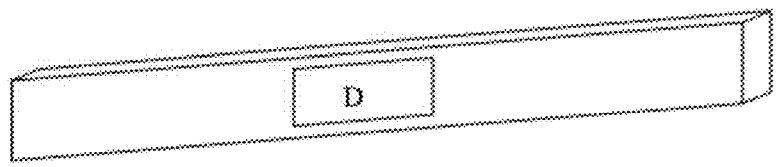
FIG. 4 illustrates a rear view of an exemplary depth map generation apparatus according to various embodiments of the present disclosure.

FIG. 4 illustrates a rear view of an exemplary depth map generation apparatus according to various embodiments of the present disclosure. The back of the depth map generation apparatus includes an attachment piece D for attaching the apparatus to a TV, a computer, or other display devices. The attachment piece D may be a magnetic strip or other appropriate attaching materials, such as a piece of tape, a clip, an inter-locking mechanical structure, etc.

In embodiments according to the present disclosure, the depth map generation apparatus may further include one or more USB ports, one or more batteries, and a wireless charging apparatus. The depth map generation apparatus may communicate with a TV or a display device through fixed wire connections, Bluetooth, wireless networks, etc. In certain embodiments, the exemplary depth map generation apparatus may be integrated with a game console or a set-top box.

Figure 5:
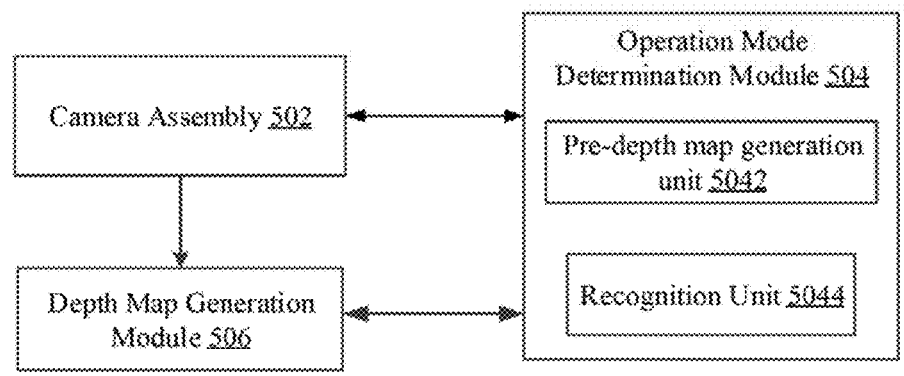
FIG. 5 illustrates a structure diagram of an exemplary depth map generation apparatus according to various embodiments of the present disclosure.

FIG. 5 illustrates a structure diagram of an exemplary depth map generation apparatus according to various embodiments of the present disclosure. As shown in FIG. 5, the exemplary depth map generation apparatus 500 may include a camera assembly 502, an operation mode determination module 504, and a depth map generation module 506. Certain components may be omitted and other components may be included to better describe relevant embodiments.

The camera assembly 502 may be configured to receive a control instruction from the operation mode determination module 504, capture stereo images according to the control instruction, and send the captured stereo images to the operation mode determination module 504. The camera assembly 502 may be a camera assembly with three cameras (e.g., shown in FIG. 3). The control instruction from the operation mode determination module 504 may include camera parameters for capturing a current scene. For example, a control instruction may specify one or more pair of cameras in the camera assembly 502 to be used for shooting.

For example, referring back to the exemplary depth map generation apparatus shown in FIG. 3, in one embodiment, the operation mode determination module 504 may instruct the camera assembly 502 to use camera A and C for capturing an image for the current scene. In another embodiment, the operation mode determination module 504 may instruct the camera assembly 502 to use camera A and B to capture an image for the current scene.

In another embodiment, the operation mode determination module 504 may instruct the camera assembly 502 to use three cameras A, B, and C. This way, three images IA, IB and IC may be obtained from cameras A, B, and C respectively. Further, three pairs of stereo images are obtained, i.e., image pair IA and IB, image pair IA and IC, and image pair IB and IC.

The operation mode determination module 504 may identify an operation mode of the depth map generation apparatus and send a control instruction to the camera assembly 502 based on the determined operation mode. The exemplary depth map generation apparatus 500 may have two operation modes: a first mode (e.g., long-distance mode) and a second mode (e.g., short-distance mode). In the first mode, images of non-adjacent cameras (e.g., camera A and C) may be used to generate the depth map. In the second mode, images of adjacent cameras (e.g., camera B and C, camera A and B) may be used to generate the depth map. The operation mode determination module 504 may decide which cameras to use based on the operation modes.

The depth map generation module 506 may process the stereo image pairs to generate depth maps based on the determined operation mode. The depth information of an object may be obtained by calculating a parallax value between two matching pixels in the left image and the right image depicting the object. A larger parallax value may indicate an object closer to the camera. A smaller parallax value may indicate an object farther away from the camera. This means that once the parallax is computed and the camera parameters are specified, the depth may be determined. Thus, the parallax value may be used to generate the depth map.

Depth maps may be stored as grayscale images that show distance instead of texture. One image from the stereo image pair (e.g., the left image) may be used as a reference image for producing the depth map. Intensity value may be assigned to each pixel coordinate according to the depth value. The depth map may be generated to have the same view as the reference image.

A measurable range of a depth map may refer to the range from the minimum measurable depth to a distance where the measurement resolution reaches a preset threshold. When the measurement resolution passes the threshold distance, the resolution may not be good enough to extract meaningful information. For example, the measurable range of two cameras placed 3 cm apart may be from about 0.16 m to 0.75 m.

In some embodiments, the depth map generation module 506 may be further configured to perform various recognition tasks according to the generated depth map and the operation mode. In one embodiment, the depth map generation module 506 may be configured to recognize body movements at the long-distance mode (i.e., the first mode). In another embodiment, the depth map generation module 506 may be configured to recognize hand and finger gestures at the short-distance mode (i.e., the first mode). Further, besides gesture recognition, the depth map generation module 506 may perform any appropriate recognition tasks based on depth information, such as tasks for object recognition, 3D scanning, etc.

The operation mode determination module 504 and the depth map generation module 506 may be implemented by one or more software modules and hardware modules. The software and hardware modules may be integrated with the camera assembly 502 or may be separate software/hardware modules placed away from the camera assembly 502. For example, the operation mode determination module 504 and the depth map generation module 506 may be implemented on one or more processors attached to the camera assembly 502. In another example, the operation mode determination module 504 and the depth map generation module 506 may be implemented on one or more processors placed in the display device on which the camera assembly 502 is attached.

Figure 6:
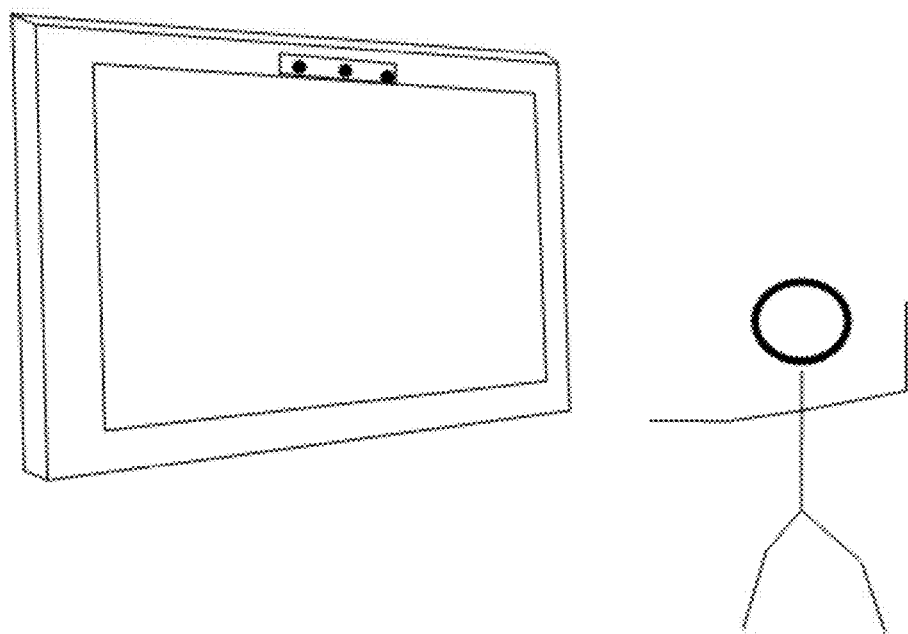
FIG. 6 illustrates an operation mode of an exemplary depth map generation apparatus according to various embodiments of the present disclosure.

FIG. 6 illustrates a long-distance mode of an exemplary depth map generation apparatus according to various embodiments of the present disclosure. In the long-distance mode, the exemplary depth map generation apparatus 500 may use one pair of non-adjacent cameras, such as camera A and camera C, to capture body movements.

As shown in FIG. 6, because the depth map generation apparatus is in the long-distance mode for body movement recognition, the apparatus may be attached to the frame of a TV to collect data associated with the positions of body joints of a user.

Figure 7:
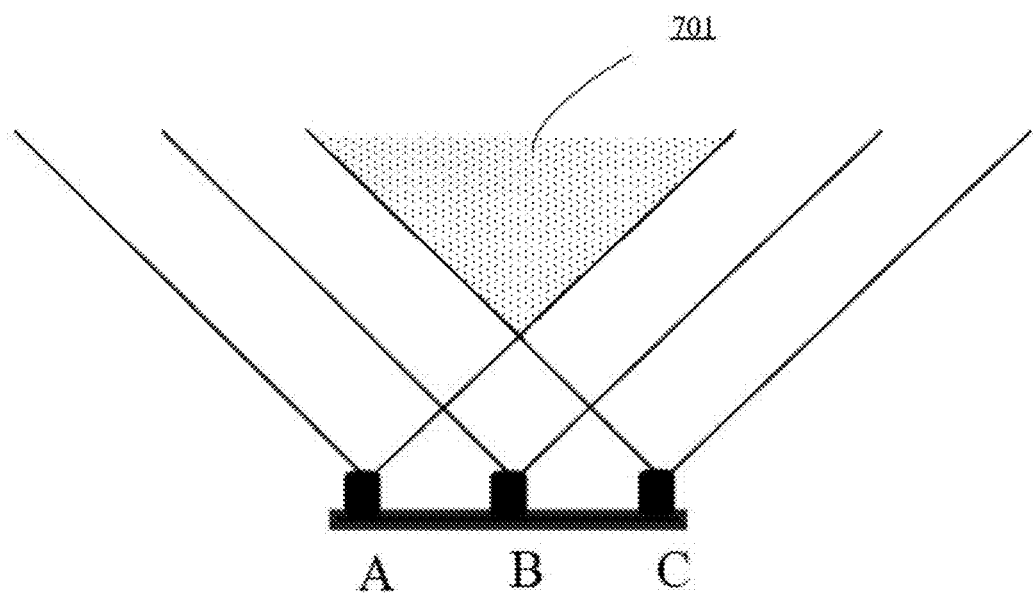
FIG. 7 illustrates a field of view (FOV) of an exemplary depth map generation apparatus according to various embodiments of the present disclosure.

FIG. 7 illustrates a field of view (FOV) of an exemplary depth map generation apparatus according to various embodiments of the present disclosure. The straight lines projecting out of a camera indicate the FOVs of the camera. As shown in FIG. 7, when the exemplary depth map generation apparatus 500 is operating in the long-distance mode, camera A and camera C may be used for capturing stereoscopic images. The dotted area 701 indicates the cross section of the FOVs of camera A and camera C. That is, the exemplary depth map generation apparatus 500 may extract depth information for objects in area 701.

In one embodiment, the distance between camera A and camera C may be 6 cm. The corresponding depth range may be about 0.5 m to about 2 m from the depth map generation apparatus.

Further, when camera A is selected as the main camera, the RGB image captured by camera A (i.e., image IA) may be used as the reference image for generating a depth map. That is, depth maps for each frame may have the same view as image IA. In this example, for objects in area 701, matching pixels in image IA and image captured by camera C (i.e., image IC) may be identified and corresponding parallax value may be calculated to assign intensity values on the depth map. For objects in image IA but not in image IC, matching pixels may not be found and the depth information may not be included in the depth map.

Figure 8:
FIG. 8 illustrates a depth map obtained from an exemplary depth map generation apparatus according to various embodiments of the present disclosure.

Therefore, a certain part of the depth map (i.e., an area in the FOV of camera A but not included in area 701) may not contain depth information. For example, FIG. 8 illustrates a depth map obtained by an exemplary depth map generation apparatus according to various embodiments of the present disclosure. When camera A is selected as the main camera, the area specified by the white rectangular shape 802 may not have depth information. Area 802 corresponds to the area in the FOV of camera A and not in the FOV of camera C.

Figure 9:
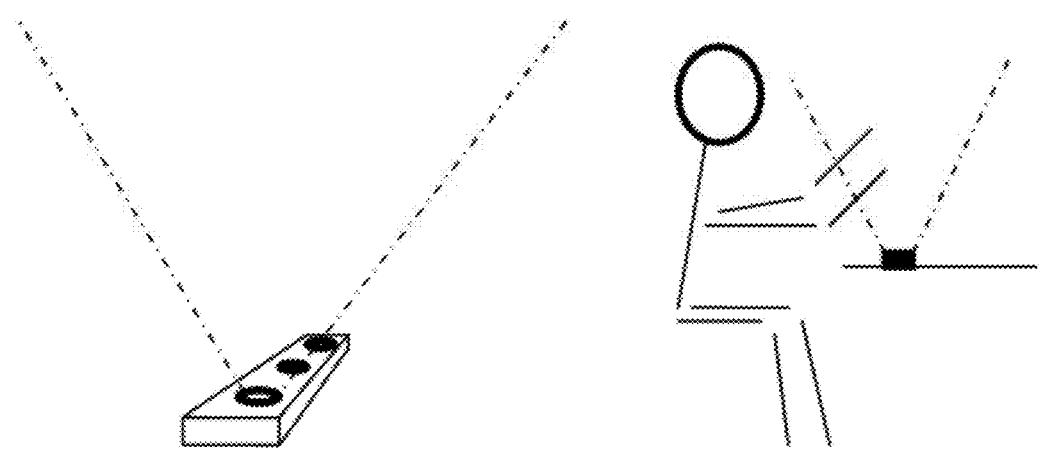
FIG. 9 illustrates another operation mode of an exemplary depth map generation apparatus according to various embodiments of the present disclosure.

Next, FIG. 9 illustrates a short-distance mode of an exemplary depth map generation apparatus according to various embodiments of the present disclosure. In the short-distance mode, the depth map generation apparatus may be placed horizontally and facing up on a desktop. The image apparatus may acquire images and detect the hand or finger gestures by the user, enabling interactions between the user and the display device.

In the short-distance mode, the exemplary depth map generation apparatus 500 may use one pair of adjacent cameras to capture hand gestures, such as camera A and B, or camera A and C. Alternatively, in some embodiments, the three cameras A, B, and C may all be used to capture stereo image pairs in the short-distance mode.

FIG. 10 illustrates the FOV of an exemplary depth map generation apparatus when three cameras A, B, and C are used at the same time. In an exemplary embodiment, camera B may be used as the main camera. As shown in FIG. 10, a first depth map generated from an image captured by camera A (i.e., image IA) and an image captured by camera B (i.e., image IB) may contain depth information of objects in both the dotted area 1001 and grid area 1003. A second depth map generated from image IB and an image captured by camera C (i.e., image IC) may contain depth information of objects in both the dotted area 1001 and lined area 1005.

As shown in FIG. 8, the first depth map generated from image IB and IA may miss depth information for objects in area 1005. In one exemplary embodiment, the first depth map and the second depth map are both generated using image IB as the reference image. Thus, the second depth map may be integrated with the first depth map to supplement the missing information. That is, the dotted area 1001, the grid area 1003, and the lined area 1005 are all included in the FOV of the exemplary depth map generation apparatus 500.

Therefore, comparing to a conventional dual-lens camera with a FOV only including dotted area 1001 and grid area 1003, the exemplary depth map generation apparatus 500 may have a wider FOV area and may obtain more depth information.

Returning to FIG. 5, the operation mode determination module 504 may be configured to identify the operation mode according to user selections or certain conditions. For example, when a user is playing a motion-sensing video game, the video game logic may inform the operation mode determination module 504 to switch between the two operation modes according to different gaming scenarios. In another example, the user may manually identify a desired operation mode.

In certain embodiments, the operation mode determination module 504 may automatically identify the operation mode. This approach may free users from specifying the operation mode, and thus enhances the user experience.

In one embodiment, the operation mode determination module 504 may include one or more orientation sensors and automatically identify the operation mode according to data collected from the orientation sensors. The sensors may be a motion sensor, a gravity/acceleration sensor, a gyroscope, etc. The operation mode determination module 504 may determine the orientation of the depth map generation apparatus 500, similar to the orientation sensing functions implemented in smartphones. For example, when the depth map generation apparatus is placed horizontally (with cameras facing upward), as shown in FIG. 9, the operation mode determination module 504 may determine that the depth map generation apparatus is in the short-distance mode. When the depth map generation apparatus is placed vertically (with cameras facing forward), as shown in FIG. 6, the operation mode determination module 504 may determine that the depth map generation apparatus is in the long-distance mode. The operation mode determination module 504 may then turn off a camera (e.g., camera B), which reduces the power consumption of the depth map generation apparatus 500.

Specifically, the motion sensor or other sensors in the depth map generation apparatus may identify a change in the orientation of the apparatus. When the data from the sensors indicate that the depth map generation apparatus is placed substantially horizontally) (±20°), the operation mode determination module 504 may instruct the display device (e.g., a TV, a computer display) to set the display device and the depth map generation apparatus to the short-distance mode, which enables hand and finger gesture recognition functions. When the data from the sensors indicate that the depth map generation apparatus is placed substantially vertically) (±20°), the operation mode determination module 504 may instruct the display device (e.g., a TV, a computer display) to set the display device and the depth map generation apparatus to the long-distance mode, which enables body movement recognition functions. Further, in the long-distance mode, the operation mode determination module 504 may turn off camera B, and determines that camera A would be used as the primary camera. In the short-distance mode, the operation mode determination module 504 may turn on camera B and use camera B as the primary camera.

In another embodiment, the operation mode determination module 504 may be configured to automatically identify the operation mode using images collected from the camera assembly 502. Specifically, the operation mode determination module 504 may further include a pre-depth map generation unit 5042 and a recognition unit 5044. The pre-depth map generation unit 5042 may be configured to generate a first depth map using images from non-adjacent cameras (i.e., in the first mode) and generate a second depth map using images from adjacent cameras (i.e., in the second mode).

The recognition unit 5044 may be configured to extract histogram information from the first depth map and the second depth map, to identify a valid object appearing at a depth range based on the histogram information, and to select one of the first mode and the second mode. That is, when the depth of the valid object is in the range of the first depth map, the operation mode determination module 504 may instruct the depth map generation module 506 to generate depth map based on the first mode. When the depth of the valid object is in the range of the second depth map, the operation mode determination module 504 may instruct the depth map generation module 506 to generate depth map based on the second mode.

FIG. 11 illustrates a flow chart of an exemplary depth map generation process 1100 according to various embodiments of the present disclosure. The exemplary process 1100 may be implemented by the exemplary depth map generation apparatus 500 and automatically identify the operation mode of the stereo exemplary apparatus 500. The operation modes may include a short-distance mode and a long-distance mode.

As shown in FIG. 11, the exemplary process may include providing a camera assembly with at least three cameras including a first camera, a second camera and a third camera (S1102). The distance between the first camera and the third camera is greater than the distance between the first camera and the second camera. In certain embodiments, the three cameras are horizontally aligned sequentially.

The first camera and the third camera may capture a first stereo image pair, and the first camera and the second camera may capture a second stereo image pair (S1104). Further, a first depth map may be generated based on the first stereo image pair, and a second depth map may be generated based on the second stereo image pair (S1106).

When the distance between the first camera and the third camera is greater than the distance between the first camera and the second camera, the first depth map may contain depth information at longer distance away from the cameras than the second depth map. That is, the first depth map may be used for a long-distance mode, and the second depth map may be used for a short-distance mode.

Further, the exemplary depth map generation apparatus 500 may automatically determine the operation mode by determining whether there is a valid object in its detection range. Specifically, when a user wants to activate the short-distance mode, a valid object (e.g., the user's hand) may appear in the measurable depth range of the second depth map. When a user wants to activate the long-distance mode, a valid object may appear in the measurable depth range of the first depth map.

A histogram may be extracted from a depth map to detect whether there is a valid object (S1108). In an exemplary embodiment, a depth map is a grayscale image. In the depth map, an intensity level of a pixel indicates its distance to the camera. In one embodiment, a histogram of a depth map may represent distributions of pixel numbers at different intensity levels in the depth map. In another embodiment, a histogram of a depth map may represent distributions of pixel numbers at different depths.

Figure 12:
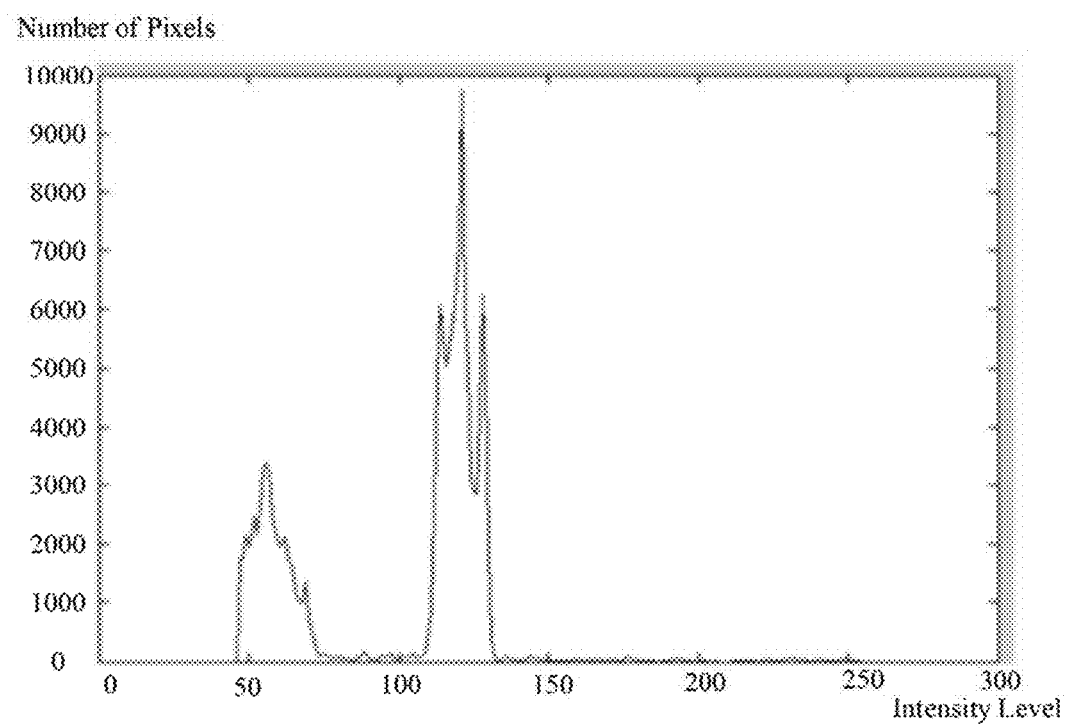
FIG. 12 illustrates an exemplary histogram obtained from a depth map according to various embodiments of the present disclosure.

FIG. 12 illustrates an exemplary histogram obtained from a depth map according to various embodiments of the present disclosure. In the example illustrated in FIG. 12, the depth map is obtained from a pair of cameras placed 6 cm away from each other. As shown in FIG. 12, the x-axis denotes the intensity level (0-255 in this case), and y-axis denotes the number of pixels. A higher intensity level may indicate that the object is closer to the camera. The area under curve of the histogram is the total pixel number of the depth map.

When there is a valid object in the measurable depth range of the depth map, a large number of pixels may aggregate in a certain range of intensity levels. For example, when a user wants to activate the long-distance mode for body movement recognition, the user may enter the FOV of the pair of cameras A and C. As shown in FIG. 12, at intensity levels ranging from 100-150 (corresponding to depth range at about 1.5 m to 2 m), there are a large number of pixels. This may indicate that the user is standing at more than 1 m away from the camera to activate the long-distance mode. In the histogram, another large aggregation of pixels appears at intensity levels ranging from 50-75. This may indicate images related to the background behind the user.

Therefore, a bump in a histogram may indicate there is a valid object in the measurable depth range of a depth map. Further, when a similar bump appears in a depth map generated from stereo images captured by cameras placed 3 cm from each other, it may suggest that the user wants to activate the short-distance mode. A bump in the histogram may be quantified as the area under curve. The area under curve may be calculated by adding number of pixels (i.e., y-coordinate values) at the intensity levels (or depths) in the range of the bump.

Returning to FIG. 11, histogram may be obtained from the first depth map and the second depth map. In one embodiment, an integrated histogram representing pixel counts and depths relationships may be obtained from the first depth map and the second depth map. The integrated histogram may cover the depths in the measurable ranges of both depth maps.

For example, the measurable range of the first depth map may be from 0.5 m to 2.0 m. The measurable range of the second depth map may be from 0.16 m to 0.75 m. The combined histogram may cover the depth ranging from 0.16 m to 2.0 m.

Further, when the measurable ranges of the two depth maps have overlaps, one depth map may be selected to provide histogram information for the overlapped range. The histogram information of the overlapped range in the other depth map may be removed. Alternatively, the number of pixels at each overlapped depth from the two depth maps may be averaged. Thus, the combined histogram may cover the entire measurable depth range of the exemplary depth map generation apparatus 500.

It should be noted that, an intensity level in the first depth map and an intensity level in the second depth map may correspond to different depths. For example, in a depth map having 256 intensity levels, intensity level 100 may represent a depth of 0.5 m for stereo images captured by cameras placed 3 cm from each other. Intensity level 100 may also represent a depth of 1.5 m for stereo images captured by cameras placed 6 cm from each other.

Therefore, when integrating histogram information from the two depth maps, the mapping relationships between intensity level and depth need to be adjusted accordingly.

In one embodiment, intensity levels of the first depth map may be converted to depth values, and intensity levels of the second depth map may be converted to depth values. Further, number of pixels corresponding to the converted depth values of the first depth map may be obtained. Number of pixels corresponding to the converted depth values of the second depth map may be obtained. Thus, the number of pixels corresponding to the converted depth values of first depth map and the second depth map may be combined to obtain the integrated histogram. The integrated histogram covers depth ranges of both the first depth map and the second depth map. The x-axis of the integrated histogram may represent depth value, and the y-axis of the integrated histogram may represent number of pixels.

In another embodiment, the histogram of the first depth map representing relationships between number of pixels and intensity levels may be expanded by adding histogram information from the second depth map to obtain the integrated histogram. Specifically, intensity levels of the second depth map may be converted a set of depth values. Further, intensity levels of the first depth map corresponding to the set of depth values may be obtained. A mapping relationship between the intensity levels of the second depth map and the intensity levels of the first depth map that correspond to the set of the depth values may be obtained. For example, intensity level 100 in the second depth map may be mapped as intensity level 250 in the first depth map.

Thus, number of pixels in the second depth map corresponding to the intensity levels of the first depth map based on the mapping relationship may be added to the histogram of the first depth map to obtain the integrated histogram. For example, the original histogram of the first depth map may include 256 intensity levels, the integrated histogram may include 500 identity levels. The x-axis of the histogram represents the intensity levels of the first depth map, and the y-axis of the integrated histogram may represent number of pixels The integrated histogram may be analyzed to identify whether a valid object appears in a first depth range corresponding to the long-distance mode or a second depth range corresponding to the short-distance mode (S1110). The first depth range is a measurable depth range of the first depth map, and the second depth range is a measurable depth range of the second depth map.

Specifically, the depth map generation apparatus 500 may preset a peak threshold, a base threshold, a first percentage threshold and a second percentage threshold. In an integrated histogram, the total number of pixels (i.e., sum of all y-coordinate values) may be twice the number of pixels in a depth map.

Figure 13:
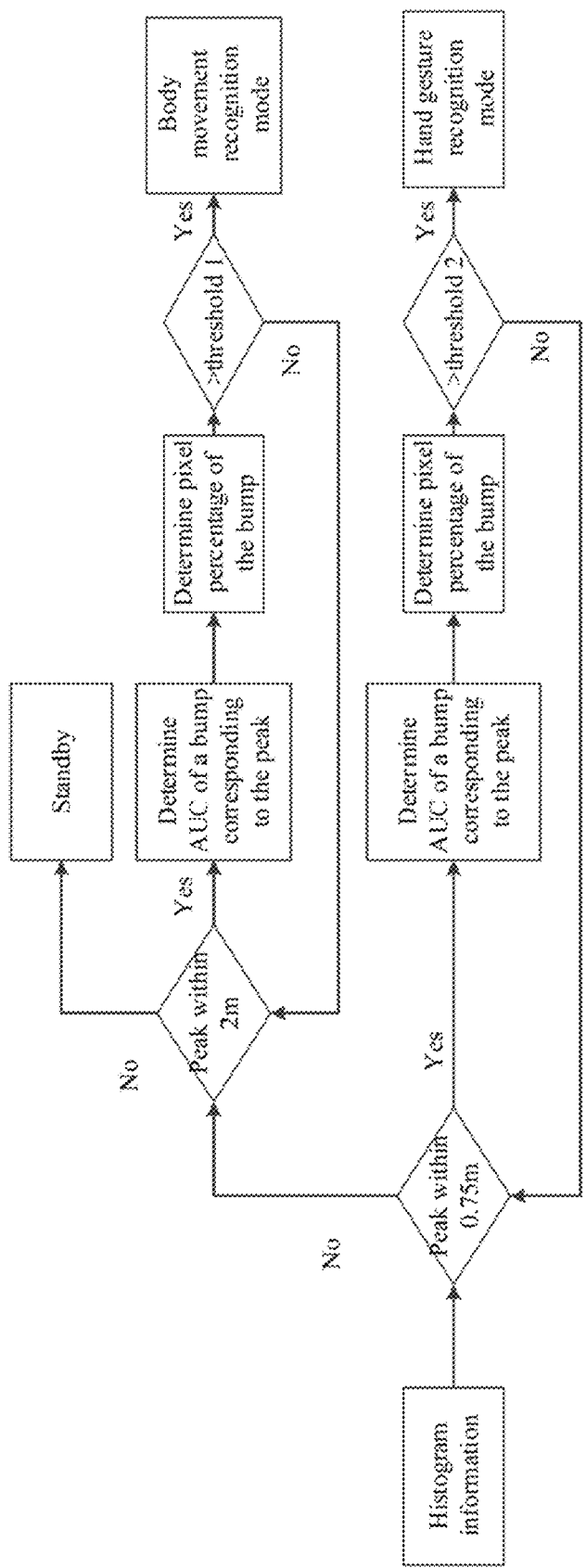
FIG. 13 illustrates a flow chart of an exemplary process for automatically determining an operation mode according to various embodiments of the present disclosure.

FIG. 13 illustrates a flow chart of an exemplary process for automatically determining an operation mode based on the extracted histogram information according to various embodiments of the present disclosure. In this example, the first depth range is 0.5 m to 2.0 m, and the second depth range is 0.16 m to 0.75 m. In one embodiment, the flow chart may be used for analyzing an integrated histogram (e.g., depth ranging from 0.16 m to 2.0 m). In another embodiment, the flow chart may be used for analyzing two histograms from the first depth map (e.g., depth ranging from 0.5 m to 2.0 m) and the second depth map (e.g., depth ranging from 0.16 m to 0.75 m).

As shown in FIG. 13, according to the extracted histogram information, the depth map generation apparatus 500 (e.g., the recognition unit 5044 of the operation mode determination module 504) may determine whether there is a peak in the second depth range by identifying whether a y-value in the second depth range is higher than the peak threshold.

When there is a peak in the second depth range, a bump corresponding to the peak in the histogram may be identified. A bump may refer to an area formed by connecting a plurality of horizontally continuous data points which includes the peak and are higher than the base threshold. The area under curve (AUC) of the bump may be calculated, which indicates the total number of pixels in the bump. Percentage of the bump in the depth map may be calculated by dividing the AUC of the bump from the total number of pixels in the depth map (e.g., 640*480 pixels).

Further, the depth map generation apparatus 500 may compare the calculated percentage with the second percentage threshold (e.g., 10%). When the calculated percentage is greater than the second percentage threshold, the apparatus 500 may determine that a valid object exists in the second depth range and the operation mode is short-distance mode.

When the calculated percentage is less than the second percentage threshold, the depth map generation apparatus 500 may determine whether there is another peak in the second depth range but not included in the previous calculated bump. When identifying another peak, the depth map generation apparatus 500 may repeat the previous determination steps.

When there is no peak in the second depth range, the depth map generation apparatus 500 may determine whether there is a peak in the first depth range. When there is no peak in the first depth range either, the depth map generation apparatus 500 may be in a standby mode.

When there is a peak in the first depth range, a bump corresponding to the peak in the histogram may be identified. The AUC of the bump may be calculated. Percentage of the bump in the depth map may be calculated by dividing the AUC of the bump from the total number of pixels in the depth map (e.g., 640*480 pixels).

Further, the depth map generation apparatus 500 may compare the calculated percentage with the first percentage threshold (e.g., 20%). When the calculated percentage is greater than the first percentage threshold, the depth map generation apparatus 500 may determine that a valid object exists in the first depth range and the operation mode is the long-distance mode.

When the calculated percentage is less than the first percentage threshold, the depth map generation apparatus 500 may determine whether there is another peak in the first depth range but not included in the previous calculated bump. When identifying another peak, the depth map generation apparatus 500 may repeat the previous determination steps.

In certain embodiments, the process illustrated in FIG. 13 may repeat a number of times (e.g., 30 times) or repeat in a preset time period. When the determined operation modes determined from a plurality of loops (e.g., more than 25 loops or longer than 1 second) are the same, the depth map generation apparatus 500 may inform the operation mode determination module 504 to activate the determined operation mode.

The present disclosure provides a non-transitory computer-readable medium having computer programs for, when being executed by a processor, performing a depth map generation method. The method may include providing a camera assembly with at least three cameras including a first camera, a second camera and a third camera. The first camera, the second camera and the third camera are sequentially aligned on a same axis. The method further includes determining an operation mode of the camera assembly. The operation mode includes at least: a first mode using images of non-adjacent cameras, and a second mode using images of adjacent cameras. Further, a depth map may be generated based on the images obtained from the camera assembly according to the determined operation mode.

Embodiments of the present disclosure efficiently use a third camera (e.g., middle camera) in a depth map generation apparatus. When the apparatus is in the long-distance mode, it may turn off the middle camera. When the apparatus is in the short-distance mode, it may turn on the middle camera to acquire more stereo images and depth information.

In various embodiments, the disclosed modules for the exemplary system as depicted above can be configured in one device or configured in multiple devices as desired. The modules disclosed herein can be integrated in one module or in multiple modules for processing messages. Each of the modules disclosed herein can be divided into one or more sub-modules, which can be recombined in any manners.

The disclosed embodiments are examples only. One of ordinary skill in the art would appreciate that suitable software and/or hardware (e.g., a universal hardware platform) may be included and used to perform the disclosed methods. For example, the disclosed embodiments can be implemented by hardware only, which alternatively can be implemented by software only or a combination of hardware and software. The software can be stored in a storage medium. The software can include suitable commands to enable any client device (e.g., including a digital camera, a smart terminal, a server, or a network device, etc.) to implement the disclosed embodiments.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A depth map generation apparatus, comprising:
a camera assembly with at least three cameras including a first camera, a second camera and a third camera, wherein the first camera, the second camera and the third camera are sequentially aligned on a same axis;
an operation mode determination module including a pre-depth map generation unit and a recognition unit, and configured to determine an operation mode of the camera assembly, wherein:
the operation mode includes at least: a first mode using images of non-adjacent cameras, and a second mode using images of adjacent cameras,
the pre-depth map generation unit is configured to generate a first depth map in the first mode and a second depth map in the second mode, and
the recognition unit is configured to extract histogram information from the first depth map and the second depth map, to identify a valid object appearing at a depth range based on the histogram information, and to select one of the first mode and the second mode based on the depth range corresponding to the valid object; and
a depth map generation module configured to generate depth maps according to the determined operation mode.

2. The depth map generation apparatus according to claim 1, wherein the operation mode determination module further comprises a sensor configured for detecting a current orientation of the camera assembly.

3. The depth map generation apparatus according to claim 2, wherein the sensor is a motion sensor, an accelerometer, an orientation sensor, or a gyroscope.

4. The depth map generation apparatus according to claim 1, wherein:
the histogram information presents distributions of number of pixels for each depth in the first depth map and in the second depth map.

5. The depth map generation apparatus according to claim 4, wherein the recognition unit is further configured to:
convert intensity levels of the first depth map and intensity levels of the second depth map to depth values;
obtain number of pixels corresponding to the converted depth values of the first depth map and the second depth map; and
combine number of pixels corresponding to the converted depth values of first depth map and the second depth map to obtain the histogram which covers depth ranges of both the first depth map and the second depth map, wherein an x-axis of the histogram represents depth values.

6. The depth map generation apparatus according to claim 4, wherein the recognition unit is further configured to:
convert intensity levels of the second depth map to a set of depth values;
obtain intensity levels of the first depth map corresponding to the set of depth values;
calculate a mapping relationship between the intensity levels of the second depth map and the intensity levels of the first depth map that correspond to the set of the depth values; and
combine number of pixels in the second depth map corresponding to the intensity levels of the first depth map based on the mapping relationship to obtain the histogram covering depth ranges of both the first depth map and the second depth map, wherein an x-axis of the histogram represents the intensity levels corresponding to the first depth map.

7. The depth map generation apparatus according to claim 4, wherein the recognition unit is further configured to:

when an area percentage of a bump in the first depth range in the histogram is greater than a first threshold, identify that the valid object appears in the first depth range; and when an area percentage of a bump in the second depth range in the histogram is greater than a second threshold, identify that the valid object appears in the second depth range.

8. A depth map generation method, comprising:
providing a camera assembly with at least three cameras including a first camera, a second camera and a third camera, wherein the first camera, the second camera and the third camera are sequentially aligned on a same axis;
generating a first depth map in a first mode, and generating a second depth map in a second mode;
extracting histogram information from the first depth map and the second depth map;
identifying a valid object appearing at a depth range based on the histogram information; and
selecting one of the first mode and the second mode based on the depth range corresponding to the valid object, wherein an operation mode includes at least: the first mode using images of non-adjacent cameras, and the second mode using images of adjacent cameras; and
generating a depth map based on the images obtained from the camera assembly according to the determined operation mode.

9. The method for depth map generation according to claim 8, further comprising:
providing a sensor to detect a current orientation of the camera assembly.

10. The method for depth map generation according to claim 9, further comprising:
when the sensor detects the current orientation of the camera assembly is substantially vertical, determining that the camera assembly operates in the first mode; and
when the sensor detects the current orientation of the camera assembly is substantially horizontal, determining that the camera assembly operates in the second mode.

11. The method for depth map generation according to claim 9, wherein the sensor is a motion sensor, an accelerometer, an orientation sensor, or a gyroscope.

12. The depth map generation method according to claim 8, wherein:
the histogram information presents distributions of number of pixels for each depth in the first depth map and in the second depth map.

13. The method for depth map generation according to claim 12, wherein extracting histogram information from the first depth map and the second depth map further comprises:
converting intensity levels of the first depth map and intensity levels of the second depth map to depth values;
obtaining number of pixels corresponding to the converted depth values of the first depth map and the second depth map; and
combining number of pixels corresponding to the converted depth values of first depth map and the second depth map to obtain the histogram which covers depth ranges of both the first depth map and the second depth map, wherein an x-axis of the histogram represents depth values.

14. The method for depth map generation according to claim 12, wherein extracting histogram information from the first depth map and the second depth map further comprises:
converting intensity levels of the second depth map to a set of depth values;
obtaining intensity levels of the first depth map corresponding to the set of depth values;
calculating a mapping relationship between the intensity levels of the second depth map and the intensity levels of the first depth map that correspond to the set of the depth values; and
combining number of pixels in the second depth map corresponding to the intensity levels of the first depth map based on the mapping relationship to obtain the histogram covering depth ranges of both the first depth map and the second depth map, wherein an x-axis of the histogram represents the intensity levels corresponding to the first depth map.

15. The method for depth map generation according to claim 12, further comprising:
when an area percentage of a bump in the first depth range in the histogram is greater than a first threshold, identifying that the valid object appears in the first depth range; and
when an area percentage of a bump in the second depth range in the histogram is greater than a second threshold, identifying that the valid object appears in the second depth.

16. The method for depth map generation according to claim 8, further comprising:
in the first mode, recognizing body movements based on the generated depth map; and
in the second mode, recognizing hand gestures and finger gestures based on the generated depth map.

17. A non-transitory computer-readable medium having computer programs for, when being executed by a processor, performing a depth map generation method, the method comprising:
providing a camera assembly with at least three cameras including a first camera, a second camera and a third camera, wherein the first camera, the second camera and the third camera are sequentially aligned on a same axis;
generating a first depth map in a first mode, and generating a second depth map in a second mode;
extracting histogram information from the first depth map and the second depth map;
identifying a valid object appearing at a depth range based on the histogram information; and
selecting one of the first mode and the second mode based on the depth range corresponding to the valid object, wherein an operation mode includes at least: the first mode using images of non-adjacent cameras, and the second mode using images of adjacent cameras; and
generating a depth map based on the images obtained from the camera assembly according to the determined operation mode.

* * * * *